United States Patent
Zajac

(10) Patent No.: US 9,249,696 B2
(45) Date of Patent: *Feb. 2, 2016

(54) VALVE ASSEMBLY AND METHOD FOR HIGH TEMPERATURE ENGINES

(71) Applicant: Zajac Optimum Output Motors, Inc., San Jose, CA (US)

(72) Inventor: John Zajac, San Jose, CA (US)

(73) Assignee: Zajac Optimum Output Motors, Inc., San Jose, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/764,896

(22) Filed: Feb. 12, 2013

(65) Prior Publication Data

US 2013/0160726 A1    Jun. 27, 2013

Related U.S. Application Data

(63) Continuation-in-part of application No. 12/485,522, filed on Jun. 16, 2009, now Pat. No. 8,371,103.

(51) Int. Cl.
| | |
|---|---|
| F02C 5/00 | (2006.01) |
| E03B 1/00 | (2006.01) |
| F01L 3/00 | (2006.01) |
| F16K 1/16 | (2006.01) |
| F16K 39/02 | (2006.01) |
| F02B 33/06 | (2006.01) |
| F01L 1/18 | (2006.01) |
| F01L 15/02 | (2006.01) |

(52) U.S. Cl.
CPC ... *F01L 3/00* (2013.01); *F16K 1/16* (2013.01); *F16K 39/024* (2013.01); *F01L 1/182* (2013.01); *F01L 15/02* (2013.01); *F02B 33/06* (2013.01); *F02G 2242/00* (2013.01)

(58) Field of Classification Search
CPC ............. F01L 3/00; F01L 1/182; F01L 15/02; F16K 39/024; F16K 1/16; F02G 2242/00; F02B 33/06
USPC ................. 60/39.6; 123/88; 137/630, 630.15; 251/158, 298
See application file for complete search history.

(56) References Cited

U.S. PATENT DOCUMENTS

| | | | |
|---|---|---|---|
| 1,474,790 A | 11/1923 | Russell | |
| 3,507,261 A * | 4/1970 | Myers et al. | 123/430 |
| 3,643,913 A * | 2/1972 | McIntosh | 251/11 |
| 3,667,740 A * | 6/1972 | Mortstedt | 261/39.2 |
| 3,955,791 A * | 5/1976 | Meckstroth | 251/11 |
| 4,252,296 A * | 2/1981 | Berg | 251/129.2 |
| 4,728,078 A | 3/1988 | Oda et al. | |

(Continued)

*Primary Examiner* — Hoang Nguyen
(74) *Attorney, Agent, or Firm* — Edward S. Wright

(57) ABSTRACT

Valve assembly and method in which a valve member is connected to an elongated lever arm for controlling communication between two chambers in an engine. The valve assembly is disposed at least partially within one of the chambers, and the valve member is moved between open and closed by an actuator connected to the lever arm. In some disclosed embodiments, a pilot valve is opened to equalize pressure on both sides of the valve member prior to moving the valve member toward the open position. In others, where a piston in an expansion cylinder is driven by hot, expanding gases from a separate combustion chamber or heat exchanger, the exhaust valve is closed before the piston has completed its exhaust stroke, and pressure is allowed to build up in the expansion cylinder to a level corresponding to the pressure in the combustion chamber before the valve member is moved toward the open position.

24 Claims, 5 Drawing Sheets

(56) References Cited

U.S. PATENT DOCUMENTS

| | | | |
|---|---|---|---|
| 5,158,111 A * | 10/1992 | Lambert et al. | 137/627.5 |
| 5,687,762 A | 11/1997 | Teets et al. | |
| 6,588,727 B2 | 7/2003 | Christoffersen et al. | |
| 7,415,947 B2 | 8/2008 | Zajac | |
| 7,434,551 B2 | 10/2008 | Zajac et al. | |
| 8,371,103 B2 * | 2/2013 | Zajac | 60/39.6 |
| 2007/0194264 A1 | 8/2007 | Arov et al. | |

* cited by examiner

VALVE ASSEMBLY AND METHOD FOR HIGH TEMPERATURE ENGINES

RELATED APPLICATION

Continuation-in-part of Ser. No. 12/485,522, filed Jun. 16, 2009.

BACKGROUND OF THE INVENTION

1. Field of Invention

This invention pertains generally to engines and, more particularly, to a valve assembly and method for high temperature engines.

2. Related Art

Valves used in conventional Otto and Diesel engines function reasonably well for some load conditions but have limitations, particularly with advanced engine designs using separate combustion chambers as described and illustrated, for example, in U.S. Pat. Nos. 7,415,947 and 7,434,551.

In conventional engines with cam operated valves, the valve springs must be stiff or strong in order to close the valves quickly and without bounce at higher engine speeds. With such springs, the force or work required to open the valves significantly limits the efficiency of an engine. Strong, stiff springs also make electronic valving difficult because of the difficulty of generating electromagnetic forces that are strong enough to overcome them. Cam operated valves are also limited by the number of degrees of cam rotation required in order to provide even a moderate valve lift or opening, and this limitation may prevent cam operated valves from meeting the timing requirements of more advanced engines. Moreover, in conventional engines, valve cooling is often required in order to prevent heat damage to the valves, and such cooling further reduces engine efficiency.

With advanced engine designs, the valves must meet additional design and performance requirements to fully utilize the capabilities of an engine. In engines having separate combustion chambers, the valves must open into the combustion chambers where the pressure is typically on the order of 500 to 1000 PSI and the temperature is on the order of 1600° K to 1800° K. Since the valve assembly is located in the pressurized hot gas instead of the exhaust or intake manifold, valve actuation must be leak tight at high pressure and at high temperature. Moreover, because of the high temperature of the valve parts, the valve must be able to function without the use of traditional lubrication, and conventional valve guides probably cannot be employed as guides or bushings in the valve assembly. Furthermore, with variable valve timing and high speed operation in advanced engines, the valve opening and closing times must be short, and valve actuation strokes must also be short. Standard valves of the types heretofore provided cannot meet the demanding needs of advanced engines.

OBJECTS AND SUMMARY OF THE INVENTION

It is, in general, an object of the invention to provide a new and improved valve assembly and method for high temperature engines.

Another object of the invention is to provide a valve assembly and method of the above character which overcomes the limitations and disadvantages of the prior art.

These and other objects are achieved in accordance with the invention by providing a valve assembly and method in which a valve member is connected to an elongated lever arm for controlling communication between two chambers in an engine, with the valve member being moved between open and closed by an actuator connected to the lever arm. In some disclosed embodiments, a pilot valve is opened to equalize pressure on both sides of the valve member prior to moving the valve member toward the open position. In others, where a piston in an expansion cylinder is driven by hot, expanding gases from a separate combustion chamber or heat exchanger, the exhaust valve is closed before the piston has completed its exhaust stroke, and pressure is allowed to build up in the expansion cylinder to a level corresponding to the pressure in the combustion chamber before the valve member is moved toward the open position.

DETAILED DESCRIPTION

Figure 1:
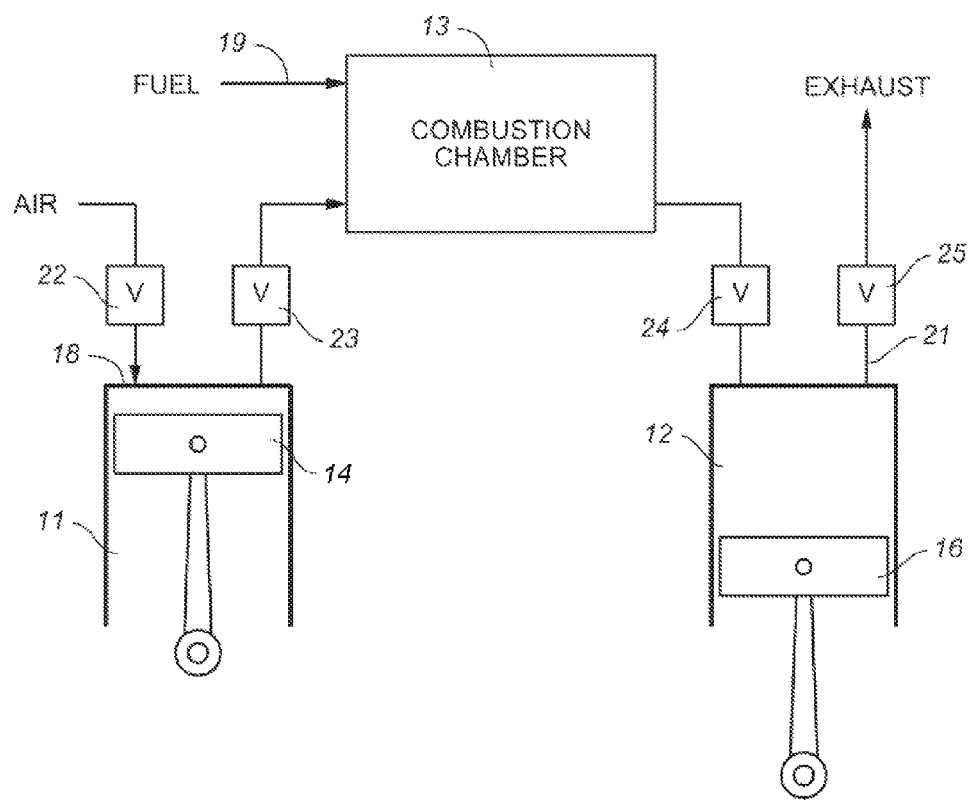
FIG. 1 is a schematic view of one embodiment of an internal combustion engine having a separate combustion chamber and a valve assembly according to the invention.

In FIG. 1, the invention is illustrated in connection with an engine of the type described in detail and illustrated in U.S. Pat. Nos. 7,415,947 and 7,434,551, the disclosures of which are incorporated herein by reference. That engine has a compression chamber 11, an expansion chamber 12 of greater volume than the compression chamber, and a separate combustion chamber 13, with reciprocating pistons 14, 16 in the compression and expansion chambers linked together by a crankshaft (not shown).

Air is drawn into the compression chamber through an inlet port 18 on the downstroke of piston 14, then compressed and thereby heated on the upstroke of the piston and injected into the inlet end of combustion chamber 13. In the combustion chamber, the hot, compressed air mixes with fuel introduced into the chamber through a fuel inlet 19 to form a mixture which burns throughout the chamber and produces a volumetric increase in the gas. The hot expanding gas is delivered to the expansion chamber where it drives expander piston 16 in a downward direction. Spent gases are expelled through an exhaust port 21 during the upstroke of the expander piston. Communication through the inlet and outlet ports and between the chambers is controlled by valves 22-25.

The sizing of the compression and expansion chambers, the movement of the pistons in them, and the timing of the valves can be made such that the temperature and/or pressure within the combustion chamber remains substantially constant throughout the operating cycle of the engine.

Figure 2:
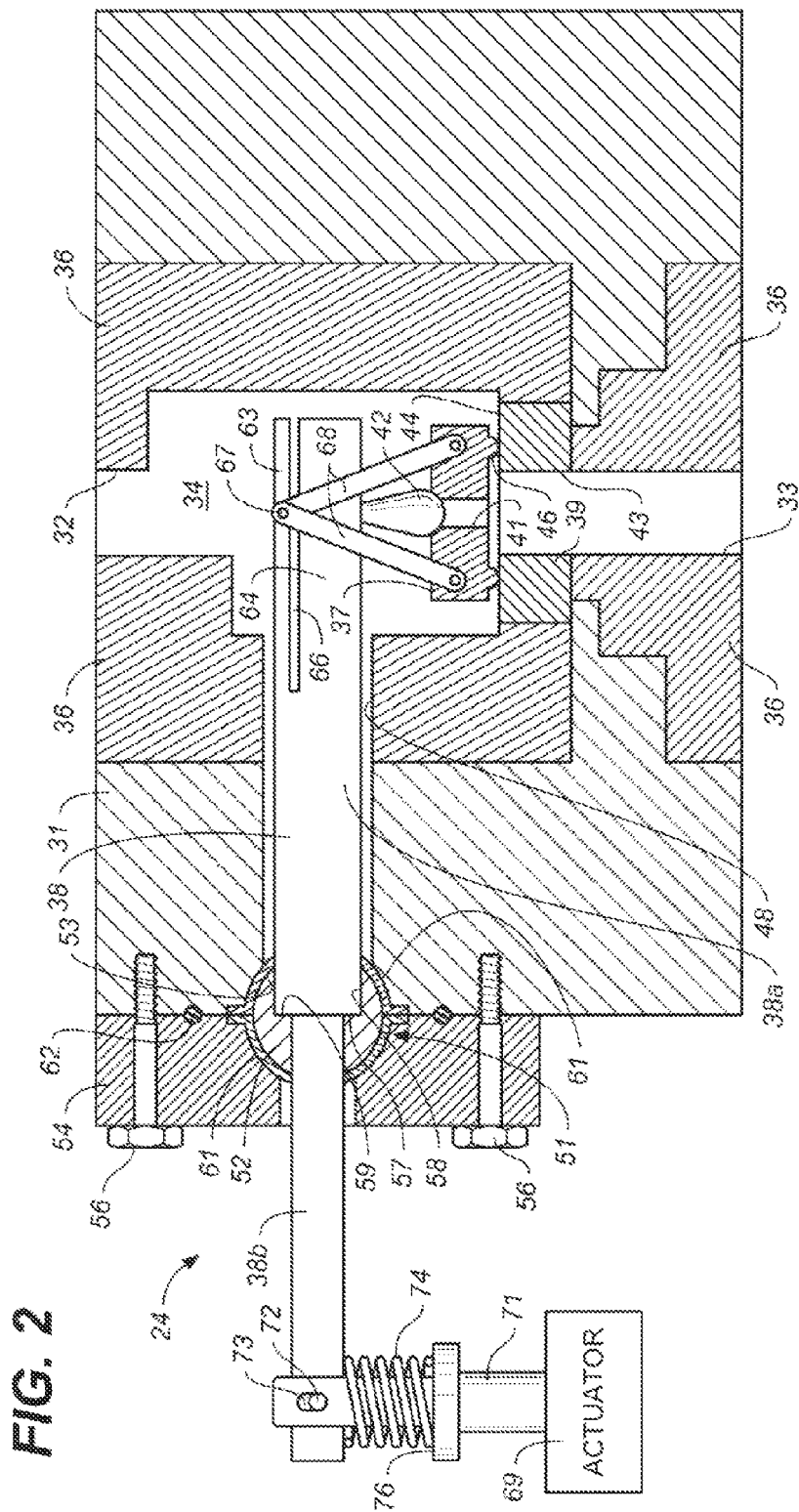
FIG. 2 is a cross-sectional view, partly schematic, of the valve assembly in the embodiment of FIG. 1.

As illustrated in FIG. 2, the valve assembly 24 that controls gas flow between the combustion chamber and the expander includes a valve body 31 having an inlet port 32 and an outlet port 33 on opposite sides of a chamber 34. The ports are surrounded by insulation 36 to prevent heat loss and loss of efficiency. Communication between the ports is controlled by a valve member 37 mounted on a lever arm 38 for movement between open and closed positions relative to a valve seat 39 which surrounds the outlet port.

Valve member 37 has a generally annular body with an axially extending passageway 41 through which gases can flow to bypass the valve member 37. Flow through the passageway is controlled by a pilot valve having a plug 42 movable between open and closed positions relative to the mouth of the passageway.

Valve seat 39 also has a generally annular body with a central opening 43 aligned axially with valve member 37 and outlet port 33. In the embodiment illustrated, the valve seat has a flat sealing surface 44 facing the valve member, and the valve member has a sealing bead 46 facing the sealing surface. Although the valve member and valve seat bodies are described and illustrated as being generally annular, they can be of any suitable shape desired.

The valve member, valve seat, and pilot valve plug can all be fabricated of a hard, high temperature ceramic material such as alumina or a strong, high temperature metal such as 90/10 tantalum/tungsten alloy that can withstand the high temperature and oxidation of the gases in the engine. When valve member 37 and valve seat 39 are ceramic, sealing can be provided by polishing the mating surfaces of the two parts to a smooth flat finish, with an overlap on the order of 0.05 to 0.25 inches generally being sufficient to prevent leakage. With high temperature metal, the seal can be made by a small sealing bead (as shown) or by a more conventional chamfered seat (not shown).

Lever arm 38 extends through a bore 48 in the valve body in a direction generally perpendicular to the axis of outlet port 33, with one end of the arm in chamber 34 and the other outside the valve body. The lever arm is mounted in a ball joint 51 comprising a ball 52 affixed to the arm and a spherical socket 53 formed partly in the valve body and partly in a retainer cap 54 which is secured to the valve body by mounting screws 56. The section 38a of the lever arm inside the valve body is of greater lateral dimension than the section 38b outside the valve body, with a shoulder 57 between the two. The ball has a stepped bore 58 through which the arm passes, with shoulder 57 abutting against a shoulder 59 within the bore. The ball is affixed to the lever arm by suitable means such as epoxy, and the abutting shoulders prevent the arm from being blown out of the ball in the event that the epoxy should ever fail.

The lever arm is fabricated of a material such as a ceramic material having a low thermal conductivity to prevent the transfer of heat from the hot gases passing through the valve to the ball joint and to the outer section of the arm. The ball is fabricated of a suitable metal, and sealing between the ball and the socket is provided by thin hemispherical or dome-shaped bushings 61 of a material such as brass which line the walls of the socket. Sealing between the retainer cap and the valve body is provided by an O-ring 62.

The inner section of the lever arm is split lengthwise into a relatively thin and flexible upper section 63 and a relatively thick and rigid lower section 64, with a slot 66 between the two sections. Valve member 37 is pivotally connected to the relatively flexible upper section by a pivot pin 67 and links 68, and pilot valve plug 42 is affixed to the under side of the relatively stiff lower section. The pivoting connection provides automatic alignment and ensures proper seating of the valve member against the valve seat, and the sealing surface of the pilot valve plug is rounded or spherical to ensure proper seating against a mating surface at the mouth of by-pass passageway 41 regardless of the position of the valve member.

An actuator 69 is connected to the outer end of the lever arm by a connector 71 for moving the valve member between open and closed positions relative to the valve seat. A pin 72 which extends laterally from the lever arm is received in vertically extending slotted openings 73 in the arms of the connector, with a compression spring 74 between the lever arm and a shoulder 76 on the connector.

In the closed position, lever arm 38 is in its horizontal or rest position, valve member 37 is sealed against valve seat 39, and pilot valve plug 42 is in its closed and sealed position against the mouth of passageway 41 in valve member 37. High pressure from inlet port 32 helps to keep the valve parts sealed so that no gas can leak out through outlet port 33.

The valve is opened by the actuator drawing the outer end of lever arm 38 in a downward direction, thereby rotating the arm in a counterclockwise direction and lifting the inner end of the arm in an upward direction. As the arm begins to rotate, the high pressure that has built up in combustion chamber 13 and in valve chamber 34 resists movement of valve member 37 away from valve seat, causing the upper section 63 of the arm to flex and the valve member to remain seated. However, with its much smaller surface area and force holding it against its seat, pilot valve plug 42 is drawn away from the mouth of passageway 41 by the stiff lower section 64 of the lever arm, thereby allowing some of the gasses to pass through the valve member and equalize the pressure on both sides of it. As the lever arm continues its rotation, valve member 37 is lifted away from seat 39 either when the pressure differential across it drops of a level which is overcome by the flexible section of the arm or when the stiff lower section abuts against the flexible upper section and thereafter carries that section with it, thus opening the valve to deliver the expanding gases from the combustion chamber to the expander.

The lift of the pilot valve and the timing between the opening of the pilot valve and the main valve are determined by the width or height of the slot between the upper and lower sections of the lever arm, and that width is chosen to be such that the pressures on the upper and lower sides of valve member 37 are substantially equal when the valve member is lifted away from the seat. With the pressures equalized, very little force is required to open the valve, and applicant has found that the valve can be opened with only a few inch-pounds of force, rather than the tens or hundreds of foot-pounds required by conventional cam driven valves.

A smaller lift permits faster valve action, and the width of the slot and lift of the pilot valve plug are typically on the order of 0.010". The amount of lift for valve member 37 is dependent upon engine size and maximum engine speed. In an engine that develops 50 hp per cylinder operating at a pressure of 600 psi, for example, the lift would be typically be on the order of 0.100", although that can vary with engine design and performance requirements. A valve assembly with a distance of 3" between the pivot axis of the lever arm and the pilot valve would require only 2° of lever arm rotation to provide the necessary 0.100 inches of lift for the valve to be fully open. This small amount of lift allows for high valve speeds, and the small amount of rotation allows for inexpensive valve shaft sealing with a long service life.

This sealing is important because high-temperature, high-pressure seals are difficult to make with linearly moving shafts and expensive to make with bellows. However, a rotating metal-to-metal, ceramic-to-ceramic, or ceramic to metal seal, as disclosed herein, eliminates this problem. Ball 52 has little rotating movement and seals tightly with the mating surfaces of the brass bushings in the ball socket To close the valve, actuator 69 pushes the outer end of lever arm 38 in an upward direction, rotating the arm in a clockwise direction and moving the inner end of the arm in a downward direction, thereby pressing pilot valve plug 42 against the mouth of the passageway in valve member 37 and pressing the valve member against valve seat 39. The manner in which actuator is connected to lever arm provides a small overclosure that ensures good contact and good sealing between valve parts. After the valve member is fully seated, the slotted openings in the connector arms allow the actuator to push the connector slightly further, until the lower walls of the openings abut against the pin, thereby compressing spring 74 slightly. The spring remains compressed until the start of the next cycle when the actuator once again pulls the connector down and the upper walls of the slotted openings engage the pin and draw the outer end of the lever arm down, too. The amount of compression should be small so as not to slow down the opening of the valve.

Some springiness or flexibility may also be provided by the flexibility of the lever arm. Depending upon how flexible the arm is, the flexibility provided by the arm can either be in addition to or in place of the flexibility provided by the spring.

The sealing surface of valve member 37 is always parallel to the sealing surface of seat 39 during sealing because the pivoting links 68 allow the parts to seal correctly even if lever arm 38 is not perfectly horizontal or parallel to the sealing surfaces at the time the parts start to mate. Any change in the length of the lever arm is not critical as long as the space between the sealing bead and the outlet port opening is greater than the change in length of the lever arm. With a flat polished surface instead of the sealing bead, sealing is ensured by making the overlap between the sealing surfaces wide enough to provide proper sealing notwithstanding changes in the length of the lever arm. With the lever arm mounted in a ball joint, the lever arm and valve member can also rotate or pivot about the axis of the lever arm to keep the sealing surfaces of the valve member and seat parallel to each other in a side-to-side direction as the valve member seats against the seat.

The pilot valve is also self-aligning with the moveable valve member to ensure a good fit and seal. The spherical end of pilot plug 42 can seal against the mouth of passageway 41 at any angle that may be created as the valve member moves to its correct seating and sealing position. In addition, the mating curvature at the mouth of the passageway ensures that the pilot plug will mate and seal with the pilot port regardless of the horizontal angle of valve member 37 or the horizontal angle of lever arm 38.

Figure 3:
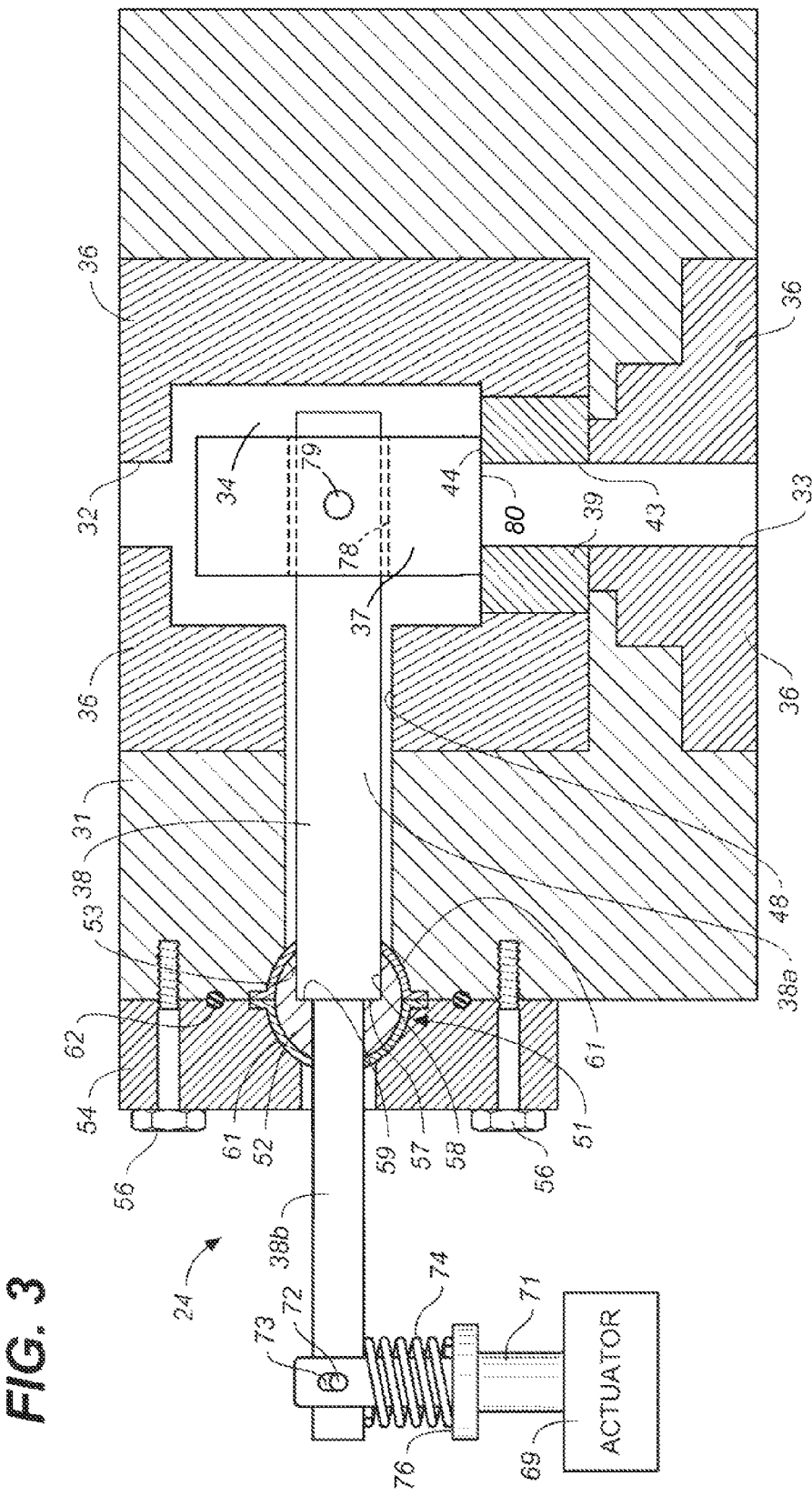
FIG. 3 is a fragmentary cross-sectional view of another embodiment of a valve assembly according to the invention.

The embodiment of FIG. 3 differs from the embodiment of FIG. 2 in that it does not have a pilot valve. Instead, it utilizes the exhaust valve in the expansion cylinder to equalize the pressure across the valve member prior to the opening of the valve. In this embodiment, lever arm 38 is a single arm of circular cross section, and valve member 37 is a solid, cylindrical block with a lateral opening 78 through which the inner end portion of lever arm 37 passes. The valve member is pivotally connected to the lever arm by a pivot pin 79 that extends through the valve body and the lever arm, with equal masses of the valve member above and below the axis of the pivot pin. The amount of pivotal movement or swing can be limited to any desired amount by proper choice of the clearance between the upper and lower surfaces of the lever arm and wall of the opening in the valve member.

In this embodiment, valve member 37 and valve seat 39 are fabricated of a high temperature ceramic material, and the valve member has a flat sealing surface 80 which seats against the flat sealing surface 44 of the valve seat.

Operation and use of the embodiment of FIG. 3 is similar to that described above except for the opening of the valve. Here, the pressure on the two sides of valve member 37 is equalized by closing the exhaust valve 25 in expansion cylinder 12 before piston 16 reaches its top dead center position so that the gas remaining in the cylinder is compressed by the piston to a pressure equal to the pressure in the combustion chamber (250 to 2000 psi) as the piston finishes its upstroke. With the pressure already equalized, the valve member starts to move away from the seat as soon as the lever arm begins its rotation, thereby providing even faster valve speeds than the embodiment with the pilot valve. Having the mass of the valve member balanced above and below the pivot axis prevents the valve member from swinging uncontrollably as the lever arm begins to rotate.

While this method of equalizing the pressure is particularly suitable for use in a constant pressure engine, it can also be utilized in other types of engines where the pressure across the valve is known. Any work done to compress this gas is recaptured when the gas expands on the down stroke, and compressing exhaust gas causes pressure above the piston to rise gradually which is considered to be beneficial for eliminating engine stress and noise. In addition, eliminating the flow of high-pressure gas into a low-pressure volume further improves the overall efficiency of the engine.

Figure 4:
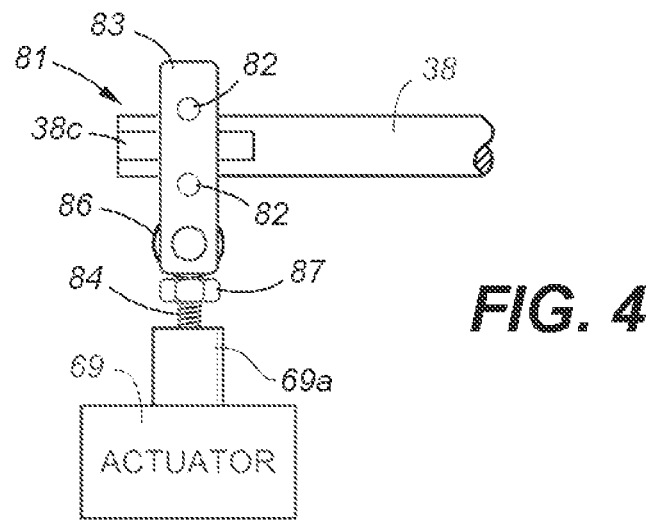
FIG. 4 is fragmentary side elevational view of another actuator assembly that can be utilized in the embodiments of FIGS. 2 and 3.
Figure 5:
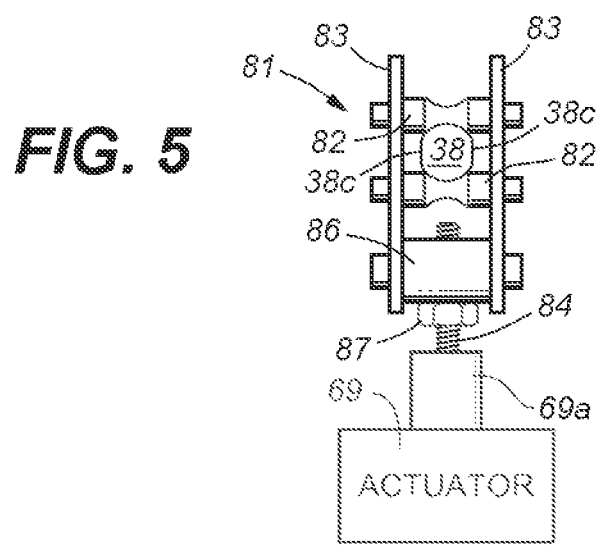
FIG. 5 is an end elevational view of the actuator assembly of FIG. 4.

FIGS. 4 and 5 illustrate an actuator assembly for moving the valve member between open and closed positions that allows greater pivotal movement about the axis of the lever arm. This assembly includes a connector 81 that has a pair of concave rollers 82, 82 rotatably mounted between a pair of side plates 83, 83 in engagement with the upper and lower surfaces of the outer end portion of lever arm 38. The connector is attached to the armature 69a of actuator 69 by a screw 84 which extends from the armature and is threadedly received in a cylindrical coupling block 86. That block is also rotatably mounted between side plates 83, 83, and a nut 87 on the screw can be tightened against the coupling block to lock the screw and block together.

The curvature of the concave surfaces of rollers 82, 82 corresponds to that of lever arm 38, and the lever arm can rotate or pivot about its axis between the rollers. The side portions of lever arm 38 that pass through the connector are cut away, as illustrated at 38c, in order to avoid interference between the sides of the lever arm and the side plates.

Figure 6:
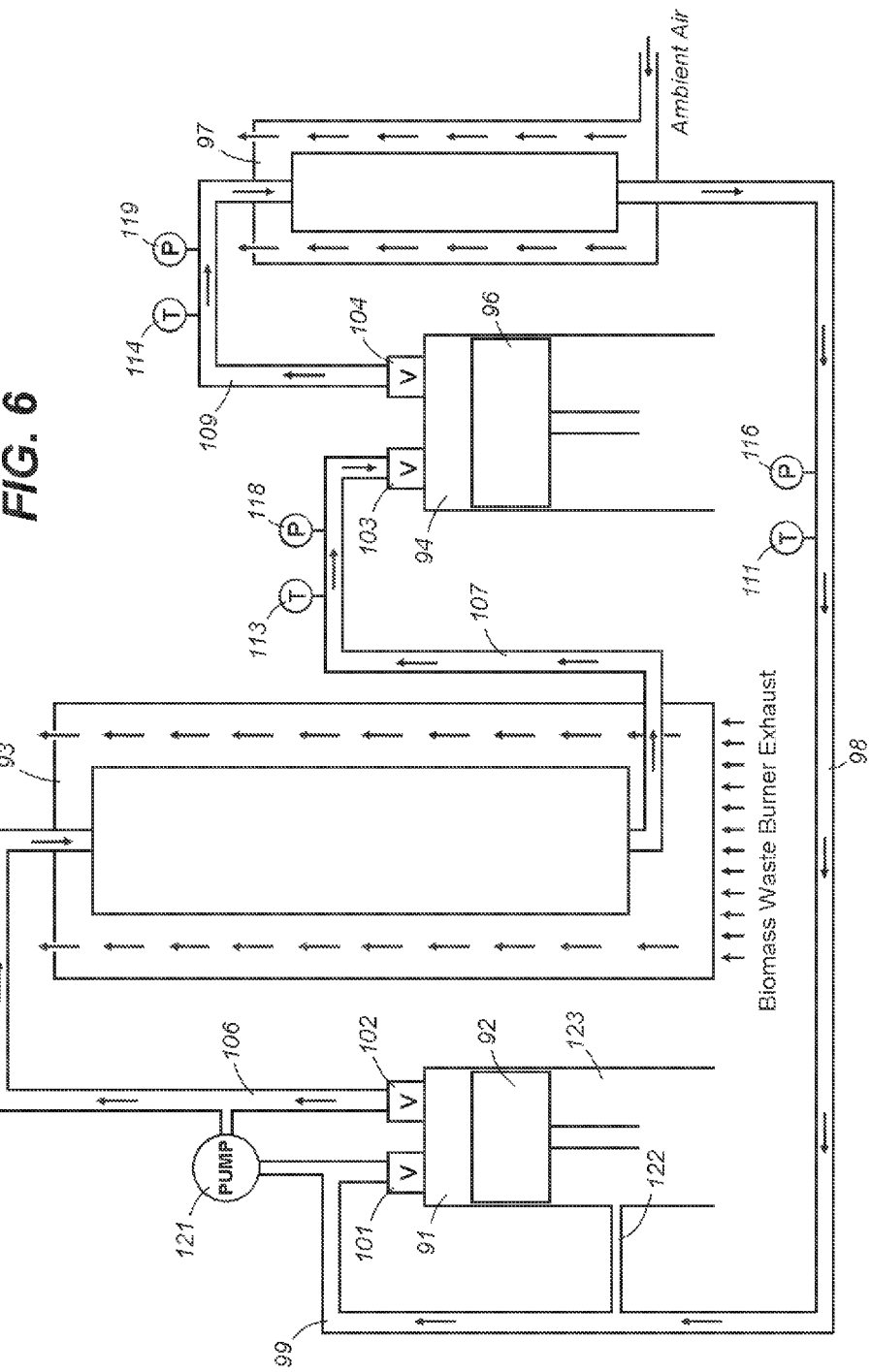
FIG. 6 is a schematic view of one embodiment of an external combustion engine incorporating the invention.

Thus far, the valve assembly has been described and illustrated in conjunction with a split cycle internal combustion engine. However, it can also be used in other types of engines and for controlling the flow of high temperature gases in other applications as well, and FIG. 6 illustrates one embodiment of an external combustion in which it is used. This engine includes a compression cylinder 91 with a reciprocating piston 92 for compressing a gaseous working fluid, a first heat exchanger 93 for heating the working fluid, an expansion cylinder 94 with a piston 96 which is driven by the heated gas, and a second heat exchanger 97 for cooling the exhaust gas from the expansion chamber. The working fluid is confined to a closed loop system, with the cooled exhaust gas from the second heat exchanger being returned to the compression chamber through a return line 98 and intake manifold 99. Pistons 92 and 96 are connected to a crankshaft (not shown) for movement in concert within their respective cylinders.

The flow of working fluid into the compression cylinder is controlled by an intake valve 101, flow between the compression cylinder and the first heat exchanger is controlled by an inlet valve 102, flow from the first heat exchanger to the expansion cylinder is controlled by an outlet valve 103, and the flow from the expansion cylinder to the second heat exchanger is controlled by an exhaust valve 104. Since outlet valve 103 is subjected to high temperature gases from heat exchanger 93, it is of the type described above and illustrated in either FIG. 2 or FIG. 3. The other three valves can be of that type as well, or they can be of other suitable design since the gases to which they are subjected are lower in temperature.

An insulated flow line 106 extends between the outlet port of compression cylinder 91 and the working fluid inlet of heat exchanger 93, and the high temperature output port of heat exchanger 93 is connected to the inlet port of expansion cylinder 94 by a flow line 107 having an insulating jacket of refractory material that can withstand the relatively high temperatures of the heated gas in the line. The exhaust port of expansion cylinder 94 is connected to the working fluid input of heat exchanger 97 by a flow line 109.

The temperature and pressure of the gas in flow lines 98, 106, 107, and 109 are monitored by temperature sensors 111-114 and pressure sensors 116-119 connected to respective ones of the lines. These sensors monitor how the engine is working and provide information that controls the operation of the engine.

A starting pump 121 is connected between the intake manifold and flow line 106 for reducing the pressure in the intake manifold and pumping gas into heat exchanger 93. This will restore proper operating pressures in the engine if it has been sanding idle for a long period of time and the high-pressure gas has leaked into the intake manifold.

A vent tube 122 is connected between the crankcase 123 and intake manifold 99 for recovering any of the working fluid that may leak past the pistons and preventing the pistons from having to move against high pressure.

The engine operates on heat from an external source such as exhaust gases produced by the burning of biomass waste, and heat exchanger 93 can, for example, be mounted on the exhaust stack of a biomass waste burning system (not shown), with the hot exhaust gases from the stack flowing upwardly through the heat exchanger and out through the top of the exchanger.

Heat exchanger 97 is similar to heat exchanger 93, but smaller in size, with ambient air flowing upwardly through it to cool the exhaust gases from the expansion cylinder.

In operation, working fluid is drawn in to the compression chamber during the downstroke of the compressor piston and compressed on the upstroke. During compression, the gaseous working fluid increases both in temperature and in pressure, and at a predetermined point, the inlet valve is opened to allow the heated, pressurized gas to enter the large heat exchanger. The piston pushes virtually all of the gas out of the compression cylinder since the volume of the cylinder with the piston at top dead center is virtually zero.

The working fluid or gas moves through the heat exchanger where it is heated and expanded. The pressure within the exchanger is relatively constant since the volume of gas entering the heat exchanger multiplied by the rate of expansion due heating within the exchanger is equal to the volume of the gas leaving the heat exchanger even though the volume of the expander is much greater than the volume of the compressor.

The highly heated gas from the heat exchanger then enters the expansion cylinder for a specific portion of the downstroke of the expander piston. The length of time the outlet valve remains open is controlled by the system controller. As noted above, the outlet valve is of the type described above and illustrated in FIG. 2 or FIG. 3. That type of valve provides maximum efficiency since it requires very little force to open and close and does not require either water cooling, which would cool the heated gasses, or oil lubrication to operate at temperatures in excess of 1,000° C. As it expands in the expansion cylinder, the working fluid or gas decreases both in temperature and in pressure.

The exhaust valve is opened when the expansion piston is at or near bottom dead center. The gas is pushed out of the cylinder on the upstroke of the piston, but the exhaust valve is closed before the piston reaches top dead center in order to pressurize the very small volume at top dead center to be approximately equal to the operating pressure of the large heat exchanger (250-2,000 psi). This causes the pressure differential between the expander cylinder and the large heat exchanger to be very small and minimizes the force required for opening the outlet valve. Reducing valve train forces and losses contribute to the high efficiency of the engine.

The exhausted gas is then passed through the small heat exchanger where it is cooled to near ambient temperature, then returned to the intake manifold for use in subsequent intake and compression cycles.

The gas used as the working fluid should be thermally stable, noncorrosive, and nonflammable as well as having a moderate ratio of specific heats and a modest product of specific heat and density. One particularly preferred working fluid is a combination of carbon dioxide which has a specific heat ratio of 1.28 and nitrogen which has a specific heat ratio of 1.4. By controlling the relative amounts of nitrogen and carbon dioxide in the mixture, the operation of the engine can be fine tuned to optimize the temperatures and pressures in the compressor and provide very safe and efficient expansion in the expander.

The working fluid is typically heated to a temperature on the order of 800° C.-1,300° C. and expanded at an effective rate of 2:1 in heat exchanger 93. If the expansion is too low little, heat is absorbed by the large heat exchanger, reducing work output. If the expansion is too great, then the temperature of compression must be low, and the working pressure in the engine is also low. The low pressure coupled with the extra heat necessary to achieve the extra expansion causes both power output and efficiency to be low.

In the embodiment of FIG. 6, the temperature of the exhaust is directly related to the amount of expansion, and neglecting thermal and pumping losses, the exhaust temperature will be proportional to the product of the intake temperature and the rate of expansion. Thus, for example, if the engine takes in gas at 300° K and has a expansion ratio of 2:1 then the temperature of the gas leaving the expander would be 600° K. When engine losses are taken into consideration, the actual expansion ratio must be higher than 2:1 in order to have an effective expansion ratio of 2:1, and with a carbon dioxide working fluid and an engine of the type shown, the actual expansion ratio may be on the order of 2.75:1. The effective expansion ratio of 2:1 works well with a 6-cylinder engine where two cylinders are used for compression and four are used for expansion. With different gases and a different choice of maximum temperature and operation pressures, the optimum expansion ratio may be different.

Since the engine uses a closed loop working fluid system, the input pressure can be increased, e.g., by adding more gas to the system. This would require more heat input to the heat exchanger and result in a greater power density, i.e., more output power per cubic inch of displacement.

While the outlet valve is preferably a variable timing valve, the compressor valves and the exhaust valve can be fixed timing valves because the heat source temperature and power generation are constant. The compressor valves can, for example, be reed valves that open when there is a pressure differential in the correct direction and close with the pressure differential is in the incorrect direction.

The invention has a number of important features and advantages. While it has been disclosed with specific reference to engines having separate combustion chambers and heat exchangers, it can also be used advantageously in split cycle engines and other types of advanced engines, as well as in more conventional engines. It provides a faster valve system, and the reduction in forces required to open the valves greatly enhances the efficiency and the performance of the engine. Efficiency is further improved by the elimination of heat loss through the valves, and the system permits variable valve timing to be readily implemented even in conventional engines. With the self-aligning manner in which the moving parts are mounted, variations due to tolerances, wear, thermal expansion, and alignment will not prevent the valves from closing tightly.

It is apparent from the foregoing that a new and improved valve system and method have been provided. While only certain presently preferred embodiments have been described in detail, as will be apparent to those familiar with the art, certain changes and modifications can be made without departing from the scope of the invention as defined by the following claims.

The invention claimed is:

1. A valve assembly for controlling high temperature gases, comprising a valve body having an internal chamber with inlet and outlet ports through which the high temperature gasses flow, a valve seat fabricated of a material capable of withstanding temperatures on the order of 1000° K-1800° K surrounding the outlet port, a pivotally mounted lever arm fabricated of material having low thermal conductivity extending into the chamber, a valve member fabricated of a material capable of withstanding temperatures on the order of 1000° K-1800° K connected to the lever arm within the chamber for movement between an open position spaced inwardly from the valve seat and a closed position in sealing engagement with the valve seat, and an actuator connected to the lever arm outside the valve body, away from the high temperature gases, for moving the valve member between the open and closed positions.

2. The valve assembly of claim 1 wherein the valve chamber and ports are surrounded by thermally insulative material that significantly reduces heat loss from the high temperature gasses to the valve body.

3. The valve assembly of claim 1 wherein the lever arm is mounted to the valve body and connected to the valve member in a manner that permits the valve member to pivot about mutually perpendicular axes into proper alignment with the valve seat as the valve member engages the valve seat.

4. The valve assembly of claim 1 wherein there is flexibility between the actuator and the valve member such that the actuator can travel slightly farther than the distance required to move the valve member to its closed position against the valve seat, thereby providing a tight seal between the valve member and seat without exerting unnecessary forces on them.

5. The valve assembly of claim 4 wherein the flexibility is provided by a spring between the actuator and the lever arm.

6. The valve assembly of claim 4 wherein the flexibility is provided by the lever arm.

7. A valve assembly for controlling communication with a chamber in an engine, comprising a valve body having an inlet and outlet ports, a valve seat surrounding one of the ports, a pivotally mounted lever arm that extends into the valve body and is split lengthwise into a relatively stiff section and a relatively flexible section, a valve member connected to the relatively stiff section of the lever arm within the valve body, an actuator connected to the lever arm outside the valve body for moving the valve member between open and closed positions relative to the valve seat, a bypass port opening through the valve member, and a pilot valve plug connected to the relatively flexible section of the lever arm for movement between open and closed positions relative to the bypass port to allow gas to bypass the valve member and thereby reduce the pressure against which the valve member must be moved.

8. The valve assembly of claim 1 wherein the valve member and the valve seat are fabricated of a ceramic material.

9. The valve assembly of claim 1 wherein the valve member and the valve seat are fabricated of aluminum oxide.

10. The valve assembly of claim 1 wherein the valve member and the valve seat have sealing surfaces which engage each other in a plane.

11. The valve assembly of claim 10 wherein the valve member is pivotally connected to the lever arm for movement about an axis parallel to the sealing surfaces.

12. The valve assembly of claim 10 wherein at least one of the sealing surfaces is flat.

13. The valve assembly of claim 10 wherein the valve seat has a flat annular sealing surface, and the valve member has an annular sealing bead that engages the annular sealing surface when the valve member is in the closed position.

14. The valve assembly of claim 1 wherein the lever arm is mounted on a pivot outside the body and away from the high temperature gases.

15. The valve assembly of claim 14 wherein the pivot is a ball joint.

16. The valve assembly of claim 15 wherein the ball joint includes a spherical socket formed partly in an outer portion of the valve body and partly in a retainer attached to the valve body.

17. A valve assembly in an external combustion engine having a compression cylinder, an expansion cylinder, pistons for varying the volumes of the compression and expansion cylinders, and an external heat exchanger in which working fluid from the compression cylinder is heated to a high temperature and pressure for delivery to the expansion cylinder, comprising: a valve body with an inlet port in communication with the heat exchanger and an outlet port in communication with the expansion cylinder, a valve seat surrounding the outlet port, a pivotally mounted lever arm extending into the valve body between the inlet and outlet ports, a valve member connected to the lever arm near the valve seat, and an actuator connected to the lever arm outside the valve body for moving the valve member between open and closed positions relative to the valve seat.

18. The valve assembly of claim 17 including a pilot valve which can be opened to allow gas to bypass the valve member prior to moving the valve member toward the open position and thereby reduce the pressure against which the valve member must open.

19. The valve assembly of claim 17 together with an exhaust valve through which spent gases are expelled during an upstroke of the piston in the expansion cylinder, and means for closing the exhaust valve before the piston finishes the upstroke to develop a pressure in the expansion cylinder substantially equal to the pressure in the heat exchanger before the valve member is moved toward its open position.

20. A method of controlling flow of high temperature, high pressure gases, comprising the steps of: introducing high temperature, high pressure gases into a chamber through an inlet port, controlling discharge of the high temperature, high pressure gases from the chamber through an outlet port with a valve member movable within the chamber between open and closed positions relative to a valve seat surrounding the outlet port, and moving the valve member between the open and closed positions from outside the chamber, away from the high temperature, high pressure gases, with an actuator arm of low thermal conductivity which extends into the chamber and is connected to the valve member within the chamber.

21. The method of claim 20 including the step of opening a pilot valve to allow gas to bypass the valve member and thereby reduce the pressure in the chamber prior to moving the valve member toward the open position.

22. The method of claim 20 wherein the inlet port communicates with a heat exchanger that produces the high temperature and high pressure gases, and the outlet port communicates with an expansion cylinder having a piston which is driven in a first direction by expanding gases from the heat exchanger, with an exhaust valve through which spent gases are expelled from the expansion cylinder when the piston is moving in an opposite direction, further including the step of closing the exhaust valve before the piston completes its travel in the opposite direction and allowing pressure to build up in the expansion cylinder to a level corresponding to the pressure in the heat exchanger before the valve member is moved toward the open position.

23. A valve assembly, comprising a body having an internal chamber with inlet and outlet ports through which hot gases flow, a valve seat which is fabricated of a material capable of withstanding temperatures on the order of 1000° K-1800° K and has a sealing surface surrounding one of the ports, a pivotally mounted lever arm of low thermal conductivity extending into the chamber for movement about a first axis perpendicular to the lever arm, a valve member which is fabricated of a material capable of withstanding temperatures on the order of 1000° K-1800° K and is connected to the lever arm within the chamber for pivotal movement about the axis of the lever arm and about an axis perpendicular to the lever arm and parallel to the sealing surface, and an actuator connected to the lever arm outside the valve body, away from the hot gases, for pivoting the lever arm about the first axis to move the valve member within the chamber between open and closed positions relative to the valve seat.

24. The valve assembly of claim 23 wherein the lever arm is mounted in a manner permitting the lever arm and the valve member to pivot about the axis of the lever arm.

\* \* \* \* \*